US009592738B1

(12) United States Patent
Paryani et al.

(10) Patent No.: US 9,592,738 B1
(45) Date of Patent: Mar. 14, 2017

(54) SERIAL COMMUNICATION SAFETY CONTROLLER (71) Applicant: Faraday&Future Inc., Gardena, CA (US)

(72) Inventors: Anil Paryani, Cerritos, CA (US); Omourtag Alexandrov Velev, La Crescenta, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/157,258

(22) Filed: May 17, 2016

Related U.S. Application Data (60) Provisional application No. 62/298,316, filed on Feb. 22, 2016, provisional application No. 62/261,229, filed on Nov. 30, 2015, provisional application No. 62/249,136, filed on Oct. 30, 2015.

(51) Int. Cl.
*B60L 3/12* (2006.01)
*G06F 11/07* (2006.01)
*B60R 16/023* (2006.01)
*G06F 13/42* (2006.01)

(52) U.S. Cl.
CPC .............. *B60L 3/12* (2013.01); *B60R 16/023* (2013.01); *G06F 11/07* (2013.01); *G06F 13/4282* (2013.01)

(58) Field of Classification Search
CPC .......... B60L 3/12; B60L 3/023; B60R 16/023; G06F 13/4282; G06F 13/42; G06F 13/38; G01R 31/3658
See application file for complete search history.

(56) References Cited

U.S. PATENT DOCUMENTS

| 2009/0085516 A1* | 4/2009 | Emori | B60L 3/0046 320/118 |
| 2010/0104929 A1* | 4/2010 | Schafer | H02J 7/0072 429/90 |
| 2014/0129164 A1* | 5/2014 | Gorbold | G01R 31/362 702/63 |

(Continued)

OTHER PUBLICATIONS

Jon Munson ; "Boost battery mgmt. systems with isoSPI data links" EE Times-India | eetindia.com; 2013, pp. 1-4.

(Continued)

*Primary Examiner* — Abby Lin
(74) *Attorney, Agent, or Firm* — Knobbe Martens Olson & Bear LLP (57) ABSTRACT

Serial communication verification and safety control is disclosed. A multi-part system such as a battery management system can include distributed or subsidiary components for determining status of various parts of the system with the components in serial or point-to-point communication with a collective main controller. A safety controller can be implemented to passively be coupled to the serial or point-to-point communication between the main controller and the subsidiary units. The safety controller can monitor and verify the communication between the main controller and the subsidiary units and send a safety command or verification indicator in another line of communication separate from the communication bus between the main controller and the subsidiary units.

10 Claims, 5 Drawing Sheets

(56) References Cited

U.S. PATENT DOCUMENTS

| | | | |
|---|---|---|---|
| 2014/0239964 A1* | 8/2014 | Gach | H02J 7/0021 |
| | | | 324/433 |
| 2015/0130471 A1* | 5/2015 | Bolduc | G01R 31/362 |
| | | | 324/427 |
| 2016/0169976 A1* | 6/2016 | Miura | G01R 31/362 |
| | | | 324/434 |
| 2016/0276855 A1* | 9/2016 | Lian | B60L 11/1872 |

OTHER PUBLICATIONS

Jon Munson ; "Low Cost isoSPI Coupling Circuitry for High Voltage High Capacity Battery Systems"; LT Journal of Analog Innovation: Apr. 2014, pp. 26-29.
Linear Technology: LTC6820 "isoSPI Isolated Communications Interface" www.linear.com/LTC6820 ; 2012, pp. 1-30.

* cited by examiner

SERIAL COMMUNICATION SAFETY CONTROLLER

CROSS-REFERENCE TO RELATED APPLICATION

This application claims the benefit under 35 U.S.C. §119(e) of U.S. Provisional Application No. 62/249,136, filed Oct. 30, 2015, and titled "ELECTRIC VEHICLE WITH PARALLEL BATTERY STRINGS," U.S. Provisional Application No. 62/261,229, filed Nov. 30, 2015, and titled "ELECTRIC VEHICLE WITH PARALLEL BATTERY STRINGS," and U.S. Provisional Application No. 62/298,316, filed Feb. 22, 2016, and titled "SERIAL COMMUNICATION SAFETY CONTROLLER," the entirety of which is hereby incorporated by reference.

BACKGROUND

Field

The described technology generally relates to electronics, more specifically, to serial communication in electronics.

Description of the Related Art

Serial communication or other similar point-to-point communication can be useful in controlling or managing various electronics. When serially communicated electronics manage certain high risk systems or operations, such as high voltage battery packs for electronic vehicles, reducing error can be critical. For example, managing a power source in an automobile, such as an electric vehicle, can be challenging as balancing the appropriate level of power, efficiency, cost, reliability, and redundancy can be difficult.

SUMMARY

The methods and devices of the described technology each have several aspects, no single one of which is solely responsible for its desirable attributes.

In one implementation, a communication apparatus comprises a main controller and a subsidiary unit connected to the main controller through a data bus. The main controller is configured to communicate with the subsidiary unit through the data bus. A safety controller is connected to the data bus and is configured to monitor one or more communications between the main controller and the subsidiary unit through the data bus, evaluate one or more communications between the main controller and the subsidiary unit through the data bus for evidence of a fault condition, and output a safety signal that is based at least in part on the results of the evaluating to an output connection separate from the data bus.

In another implementation, an electric vehicle comprises a motor coupled to one or more wheels of the electric vehicle, an inverter coupled to the motor, at least a first power bus coupled to the inverter, at least a first battery string comprising a plurality of battery modules, wherein the first battery string has an output that is coupled to the first power bus through a switch. Also provided is at least a first battery string controller coupled to the first battery string, a plurality of battery module monitors coupled to respective ones of the plurality of battery modules and in communication with the first battery string controller, and at least a first safety controller associated with the battery string controller configured to evaluate communications between the first battery string controller and the first battery module monitor.

In another implementation, a method of detecting fault conditions in a circuit comprises receiving data and/or commands communicated from a main controller to at least a first subsidiary unit through a data bus, receiving data communicated from the first subsidiary unit to the main controller through the data bus, comparing the received data and/or commands from the main controller to the first subsidiary unit with expected data and/or commands from the main controller to the subsidiary unit, comparing the received data from the first subsidiary unit to the main controller with expected data from the first subsidiary unit to the main controller, and outputting a safety signal through a connection separate from the data bus.

BRIEF DESCRIPTION OF THE DRAWINGS

These drawings and the associated description herein are provided to illustrate specific embodiments of the invention and are not intended to be limiting.

DETAILED DESCRIPTION

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to automotive systems and/or different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Serial communication verification and safety control is disclosed. A multi-part system such as a battery management system can include distributed or subsidiary components for determining status of various parts of the system with the components in serial or point-to-point communication with a collective main controller. A safety controller can be implemented to be passively coupled to the serial or point-to-point communication between the main controller and the subsidiary units. The safety controller can monitor and evaluate communications between the main controller and the subsidiary unit(s) and send a safety signal or verification indicator over another line of communication separate from the communication bus between the main controller and the subsidiary units.

Figure 1:
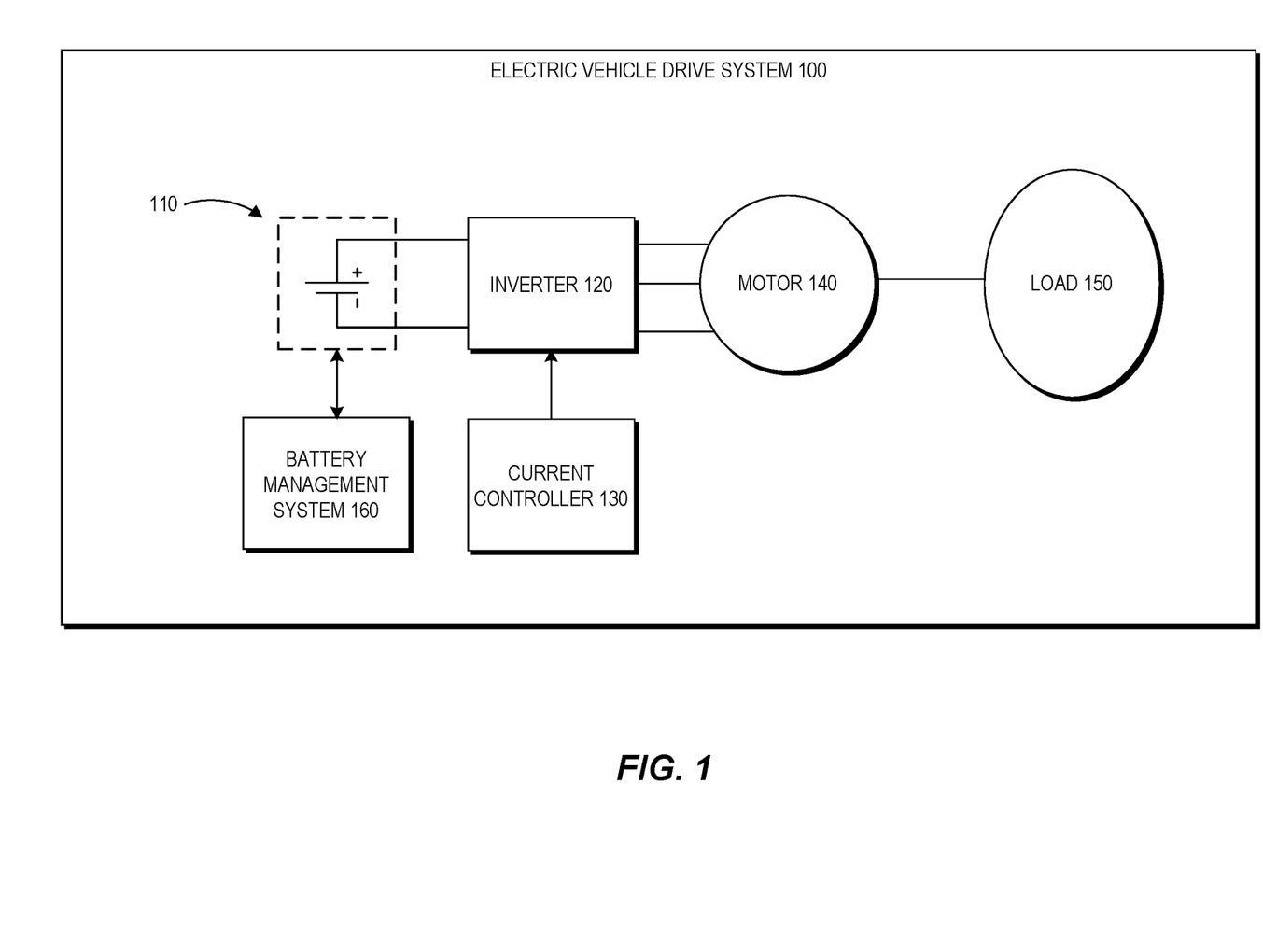
FIG. 1 is a block diagram of an example electric vehicle drive system according to one embodiment.

FIG. 1 depicts a block diagram of an example electric vehicle drive system 100 including a battery management system 160 as described herein. The electric vehicle drive system 100 includes the battery or voltage source 110, an inverter 120 coupled to the battery 110, a current controller 130, a motor 140, and load 150, and the battery management system 160. The battery 110 can be a single phase direct current (DC) source. In some embodiments, the battery 110 can be a rechargeable electric vehicle battery or traction battery used to power the propulsion of an electric vehicle including the drive system 100. Although the battery 110 is illustrated as a single element in FIG. 1, the battery 110 depicted in FIG. 1 is only representational, and further details of the battery 110 are discussed below in connection with FIG. 2.

The inverter 120 includes power inputs which are connected to conductors of the battery 110 to receive, for example, DC power, single-phase electrical current, or multi-phase electrical current. Additionally, the inverter 120 includes an input which is coupled to an output of the current controller 130, described further below. The inverter 120 also includes three outputs representing three phases with currents that can be separated by 120 electrical degrees, with each phase provided on a conductor coupled to the motor 140. It should be noted that in other embodiments inverter 120 may produce greater or fewer than three phases.

The motor 140 is fed from voltage source inverter 120 controlled by the current controller 130. The inputs of the motor 140 are coupled to respective windings distributed about a stator. The motor 140 can be coupled to a mechanical output, for example a mechanical coupling between the motor 140 and mechanical load 150. Mechanical load 150 may represent one or more wheels of the electric vehicle.

Controller 130 can be used to generate gate signals for the inverter 120. Accordingly, control of vehicle speed is performed by regulating the voltage or the flow of current from the inverter 120 through the stator of the motor 140. There are many control schemes that can be used in the electric vehicle drive system 100 including current control, voltage control, and direct torque control. Selection of the characteristics of inverter 120 and selection of the control technique of the controller 130 can determine efficacy of the drive system 100.

The battery management system 160 can receive data from the battery 110 and generate control signals to manage the battery 110. Further details of the battery management system 160 are discussed in connection with FIGS. 2-3 below.

Although not illustrated, the electric vehicle drive system 100 can include one or more position sensors for determining position of the rotor of the motor 140 and providing this information to the controller 130. For example, the motor 140 can include a signal output that can transmit a position of a rotor assembly of the motor 140 with respect to the stator assembly motor 140. The position sensor can be, for example, a Hall-effect sensor, a magnetoresistive sensor, potentiometer, linear variable differential transformer, optical encoder, or position resolver. In other embodiments, the saliency exhibited by the motor 140 can also allow for sensorless control applications. Although not illustrated, the electric vehicle drive system 100 can include one or more current sensors for determining phase currents of the stator windings and providing this information to the controller 130. The current sensor can be, for example, a Hall-effect current sensor, a sense resistor connected to an amplifier, or a current clamp.

It should be appreciated that while the motor 140 is described as an electrical machine that can receive electrical power to produce mechanical power, it can also be used such that it receives mechanical power and thereby converts that to electrical power. In such a configuration, the inverter 120 can be utilized to excite the winding using a proper control and thereafter extract electrical power from the motor 140 while the motor 140 is receiving mechanical power.

Figure 2:
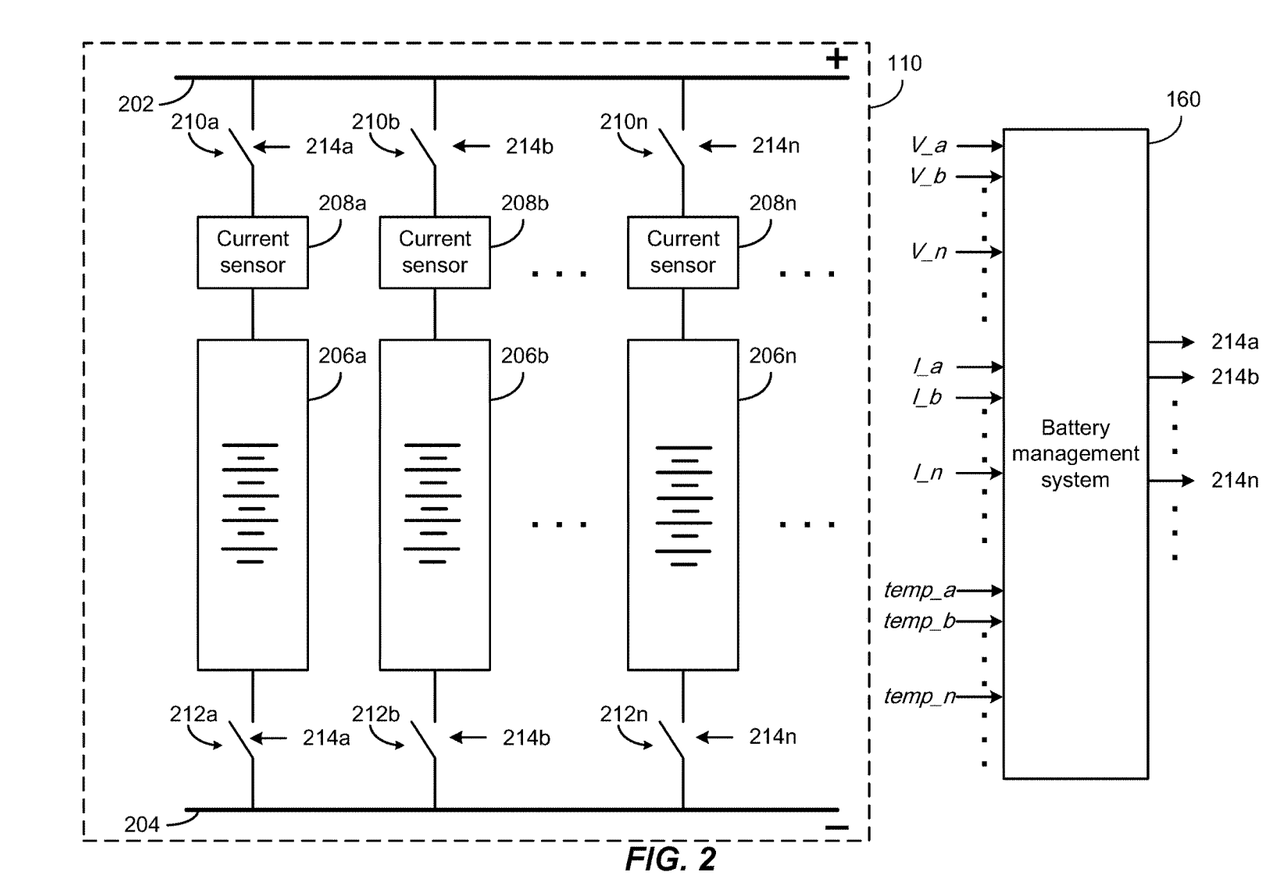
FIG. 2 is a block diagram of an example voltage source and battery management system according to one embodiment.

FIG. 2 is a block diagram of an example voltage source according to one embodiment. The voltage source 110 can include a plurality of battery strings 206a, 206b, . . . 206n, . . . , individually or collectively referred to herein as the battery string(s) 206, and a plurality of current sensors 208a, 208b, . . . , 208n, . . . , individually or collectively referred to herein as the current sensor(s) 208. The battery strings 206 can be individually connected to or disconnected from a positive or high power bus 202 and a negative or low power bus 204 through a plurality of switches 210a, 210b, . . . , 210n, . . . , and 212a, 212b, . . . , 212n, . . . , individually or collectively called the switches 210 and 212. The switches 210 and 212 can be controlled by control signals from a battery management system 160. The battery management system 160 can receive, among others, voltages, V_a, V_b, . . . , V_n, . . . which can be output voltages across the respective battery strings 206a, 206b, . . . , 206n, . . . determined using, for example a plurality of sensors (not shown). The battery management system 160 can also receive currents, I_a, I_b, . . . , I_n, . . . , which are currents from the respective battery strings 206a, 206b, . . . , 206n, . . . , measured by the respective current sensors 208a, 208b, . . . , 208n, . . . . The battery management system 160 also can receive temperature measurements, temp_a, temp_b, . . . , temp_n, . . . , which are one or more of temperature measurements from the respective battery strings 206a, 206b, . . . 206n, . . . , measured by one or more temperature sensors (not shown) accompanying the battery strings. Based at least in part on the voltages, V_a, V_b, . . . , V_n, . . . , currents, I_a, I_b, . . . , I_n, . . . , and/or temperatures, temp_a, temp_b, . . . , temp_n, . . . of the respective battery strings 206, the battery management system 160 can generate control signals 214a, 214b, . . . , 214n, . . . , individually or collectively referred to herein as the control signal(s) 214, for controlling the respective switches 210 and 212. As further described below, in addition to or instead of voltage, current and/or temperature data of the battery strings 206, the battery management system 160 may receive respective voltage, current, and/or temperature data of subsets or parts, such as modules and/or cells, of each of the battery strings 206. Further details of the battery management system 160 are discussed below in connection with FIG. 3.

The battery strings 206 can include a plurality of modules, each of which in turn can include a plurality of cells. Within each battery string 206, the constituent modules and cells can be connected in series as symbolically depicted in FIG. 2. In some embodiments, the voltage source 110 can include six battery strings 206 that can be connected to or disconnected from the power buses 202, 204. The battery strings 206 can be implemented with various different types of rechargeable batteries made of various materials, such as lead acid, nickel cadmium, lithium ion, or other suitable materials. In some embodiments, each of the battery strings can output about 375 V to 400 V if charged about 80% or more.

The current sensors 208 can be connected in series with the respective battery strings 206 between the high and low power buses 202, 204. As shown in FIG. 2 the current sensor 208 can be connected to the positive side of the respective battery strings 206 to measure the current discharged from the battery strings 206. In other embodiments, the current sensors 208 can be connected to the battery strings 206 otherwise to measure the current flow due to discharging of the battery strings 206.

The switches 210 and 212 can be contactors configured to connect the battery strings 206 to the power buses 202, 204 or disconnect the battery strings 206 from the power buses 202, 204 in response to the respective control signals 214. The switches 210 can be implemented with any suitable contactors capable of handling the level of current and voltage as needed in connection with, for example, the battery strings 206, the power buses 202, 204, and the load 150 (FIG. 1) within the electric vehicle drive system 100 (FIG. 1). In some embodiments the switches 210 and 212 can be implemented with mechanical contactors with solenoid inside. In some embodiments, the switches 210 can be powered by one or more drivers in the battery management system 160. Although in the illustrated example in FIG. 2, the switches 210 (e.g., 210n) and the switches 212 (e.g., 212n) are controlled by the same respective control signals 214 (e.g., 214n), in other embodiments, the switches 210 (e.g., 210n) can be controlled by respective positive bus connect control signals while the switches 212 (e.g., 212n) can be controlled by respective negative bus connect control signals.

The battery management system 160 can include a plurality of passive and/or active circuit elements, signal processing components, such as analog-to-digital converters (ADCs), amplifiers, buffers, drivers, regulators, or other suitable components. In some embodiments, the battery management system 160 can also include one or more processors to process incoming data to generate outputs, such as the control signals 214. In some embodiments, the battery management system 160 can also include one or more components for communicating and sending and receiving data within the battery management system 160 and/or with other components or circuitries in the electric vehicle. For example, the various components and circuits within the system 100, including components in the battery management system 160 can be in communication with one another using protocols or interfaces such as a controller area network (CAN) bus, serial peripheral interface (SPI), or other suitable protocols or interfaces. And in some embodiments, the processing of incoming data can be at least in part performed by other components not in the battery management system 160 within the electric vehicle as the battery management system 160 communicates with other components.

Figure 3:
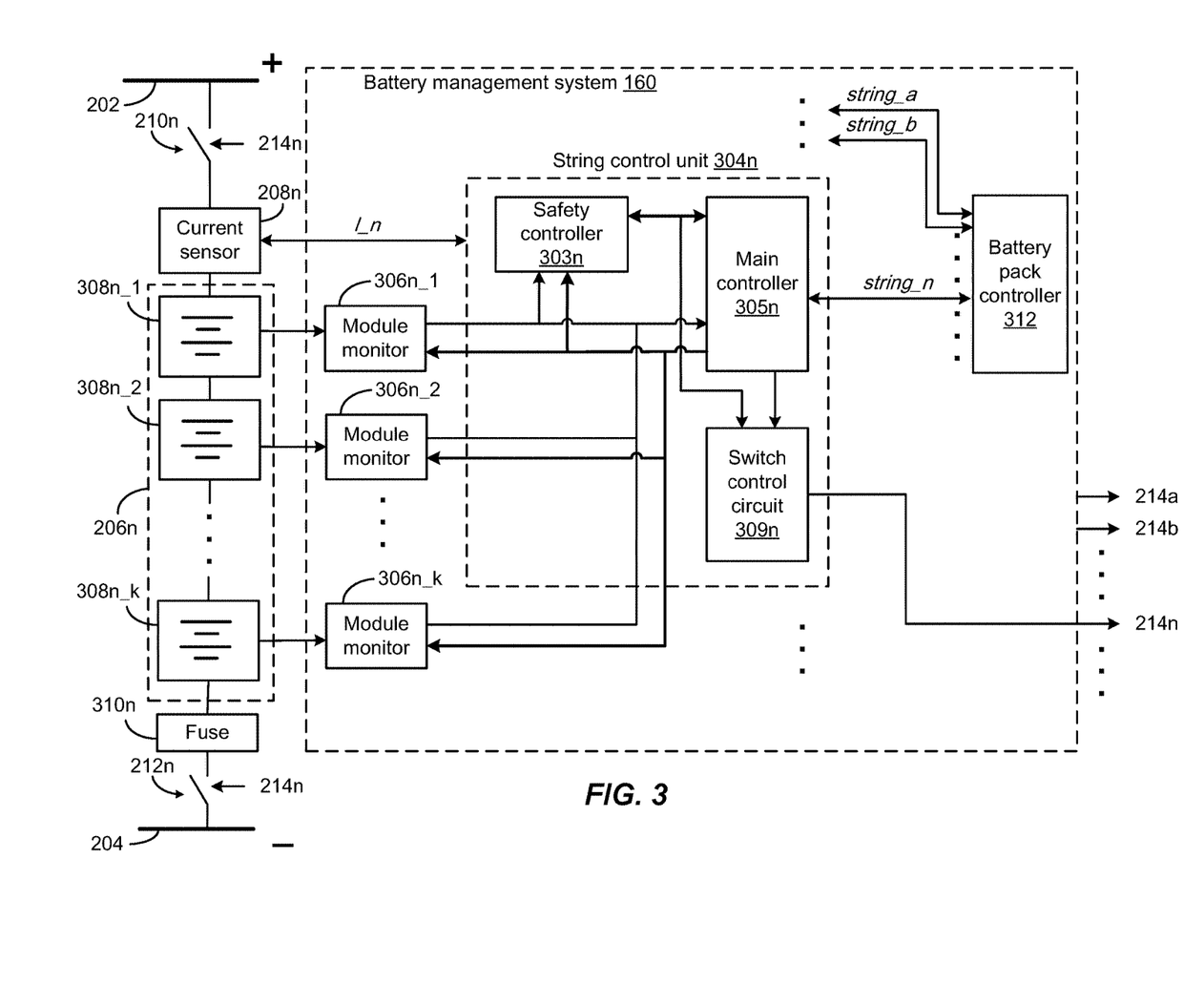
FIG. 3 is another block diagram of an example voltage source and battery management system according to one embodiment.

FIG. 3 is another block diagram of example voltage source and battery management system according to one embodiment. In FIG. 3, one exemplary battery string 206n of the plurality of battery strings 206 of FIG. 2 is illustrated, and accordingly, the corresponding current sensor 208n, switches 210n, 212n, and connect control signal 214n are illustrated. Also illustrated is a fuse 310n corresponding to the battery string 206n, and although not illustrated, the battery strings 206a, 206b, . . . , 206n, . . . in FIG. 2 may each also have corresponding fuse 310a, 310b, . . . , 310n, . . . . The battery string 206n includes a plurality of battery modules 308n_1, 308n_2, . . . , 308n_k (individually or collectively referred to herein as the battery modules 308n for the battery string 206n), each sending battery module telemetry data to respective module monitors 306n_1, 306n_2, . . . , 306n_k (individually or collectively referred to herein as the module monitors 306n for the battery string 206n) of the battery management system 160. The battery management system 160 includes a string control unit 304n for the battery string 206n in communication with the battery modules 308n_1, 308n_2, . . . , 308n_k for the battery string 206n. The string control unit 304n includes a safety controller 303n, a main controller 305n, and a switch control circuit 309n. As illustrated the safety controller 303n can be configured to monitor the communication between the module monitors 306n and the main controller 305n for the battery string 206n. Further details of the communication among the module monitors 306n, safety controller 303n, and the main controller 305n are discussed in connection with FIG. 4 below.

Although not illustrated, the battery management system 160 also may include respective string control units 304a, 304b, . . . , 304n, . . . for the plurality of battery strings 206a, 206b, . . . , 206n, . . . illustrated in FIG. 2. The battery management system 160 also includes a battery pack controller 312, which controls a switch driver 314 and is in communication with the plurality of string control units 304. In some embodiments, the battery management system 160 can also include an analog-to-digital converter (ADC) internal or external to one or more controllers, such as the main controller 305n and the battery back controller 312, for processing analog data.

In the illustrated embodiment, the nth battery string 206n has k number of battery modules 308n and k number of module monitors 306n_1, 306n_2, . . . , 306n_k. In some embodiments, one battery string 206 may include, for example 6 battery modules 308 in series. In some embodiments, one battery module 308 may include, for example, 16 battery bricks in series, and a battery brick may include 13 battery cells in parallel. Also, in some embodiments the voltage source 110 (FIG. 1) of the electric vehicle drive system 100 (FIG. 1) can include one battery pack, which includes, for example 6 battery strings 206. A battery cell can be, for example, a Li-ion cell, and the battery pack for the electric vehicle drive system 100 can provide power greater than, for example, 500 kW.

Each of the battery modules 308 may be assembled with sensors and an interface that are configured to gather various battery module telemetry data such as voltage, current, charge, temperature, etc., which are communicated to the module monitors 306. In the illustrated embodiment, the module monitors 306n_1, 306n_2, . . . , 306n_k communicate with the main controller 305n of the string control unit 304n using a communication protocol, such as isolated serial peripheral interface (isoSPI). In the illustrated embodiment, the module monitors 306n can gather, for example, temperature and voltage data of the respective modules 308n and communicate them to main controller 305n of the string control unit 304n. In some embodiments, each of the module monitors 306n can include signal processing units, such as an ADC for processing analog inputs from the battery modules 308n regarding their respective temperature and/or voltage. In some embodiments, the module monitors 306n can be individually and directly in communication with the main controller 304n as illustrated, and in other embodiments, the module monitors 306n can be collectively and/or indirectly in communication with the main controller 305n through a communication bus or in a daisy chained configuration.

The string control unit 304n includes components responsible for controlling the entire battery string 206n, controlling functions such as opening or closing of the switches 210n, 212n for electric vehicle operations or emergency procedures based on, for example, various status data of the battery string 206n. In some embodiments the string control unit 304n includes the main controller 305n, which can be implemented with a microprocessor capable of communicating with other components with one or more communication protocols or interfaces, such as SPI, isoSPI, CAN bus, universal synchronous asynchronous receiver transmitter (USART), universal asynchronous receiver transmitter (UART), etc. The string control unit 304n can be configured to receive and process data regarding temperature, current, and voltage data of the individual battery modules 308n and/or the entire battery string 206n. In the illustrated embodiment, the string control unit 304n can be in communication with the current sensor 208n and receive, for example, the current reading I_n of the battery string 206n. Also in some embodiments, the string control unit 304n can include signal processing units, such as an ADC either within or separate from the main controller 305n, for processing analog signals from the battery string 206n. For example, the string control unit 304n can receive and process voltage measurements across the battery string 206n disconnected from the positive and negative power buses 202, 204 and voltage measurements across the positive and negative power buses 202, 204 with the battery string 206n connected to the power buses 202, 204 (i.e., with the switches 212n, 214n closed). The string control unit 304n can also perform additional tests and monitoring, such as performing isolation tests and executing battery management algorithms.

The module monitors 306n are configured to monitor status of the battery modules 308n and the battery string 206n by gathering data regarding voltage and temperature of the battery modules 308n. In the illustrated embodiment, the module monitors 306n are in serial or point-to-point communication with the main controller 305n of the string control unit 304n. In some embodiments, the module monitors 306n can communicate with the main controller 305n using a communication protocol such as isoSPI, and each the module monitors 306n can incorporate communication capabilities of an isoSPI slave or subsidiary device. In other embodiments, the multiple subsidiary units (i.e., the module monitors 306n) can be in communication with the main controller 305n in a daisy chained manner.

The safety controller 303n can be configured to monitor, observe, or listen to the data communication between the subsidiary units, such as the module monitors 306n, and the main controller 305n in order to evaluate the communication, e.g. determine if there is evidence of the existence of a fault condition, especially a fault condition in the electronics of the module monitor and/or the main controller. While the communication between the module monitors 306n and the main controller 305n can be bidirectional through a communication bus, the safety controller 303n may only be coupled to the communication bus in a manner configured to passively monitor or receive data communicated between the module monitors 306n and the main controller 305n without transmitting any signals onto the bus itself. In some embodiments, the safety controller 303n can be implemented with a microprocessor capable of communicating with other components with various communication protocols or interfaces, such as SPI, isoSPI, CAN bus, universal synchronous asynchronous receiver transmitter (USART), universal asynchronous receiver transmitter (UART), etc. Further details of the safety controller 303n are discussed in connection with FIG. 4 below.

Safety action circuitry can also be coupled to the safety controller 303n and/or the main controller 305n to implement specific desired safety actions in the event a fault condition is suspected. For example, a switch control circuit 309n can generate the control signal 214n for controlling one or both of the switches 210n and 212n of the battery string 206n based on signals received from the safety controller 303n and the main controller 305n. In some embodiments, the switch control circuit 309n can implement a logic function, such as an AND gate. Further details of the switch control circuit 309n are discussed in connection with FIG. 4 below. It is to be noted that respective switch control circuits 309a, 309b, . . . 309n, . . . in the string control units 304a, 304b, . . . , 304n, . . . for the battery strings 206a, 206b, . . . , 206n, . . . (FIG. 2) can perform the same functions for the respective battery strings 206 so that the battery management system 160 as a whole outputs the control signals 214a, 214b, . . . , 214n, . . . from the respective switch control circuits 309a, 309b, . . . 309n, . . . to the corresponding switches 210a, 210b, . . . , 210n, . . . , and 212a, 212b, . . . , 212n, . . . .

Further details of the main controller 305, the safety controller 303, and the switch control circuit 309 are discussed in connection with FIGS. 4-5 below.

The battery pack controller 312 in the illustrated embodiment can be in communication with the plurality of main controllers 305a, 305b, . . . , 305n, . . . of the plurality of string control units 304a, 304b, . . . , 304n, . . . . In some embodiments, various data from the one or more of the battery strings (e.g., string_a, string_b, . . . , string_n, . . . ) can be communicated using CAN bus and the battery management system 160 may include a plurality of CAN bus transceivers (not shown). The battery pack controller 312 can be in further communication with other devices, components, or modules of the electric vehicle. In certain instances, the battery pack controller 312 can communicate to components such as a switch driver, to cut power and disconnect all the switches 210 and 212, for example, in case of an air bag deployment.

Figure 4:
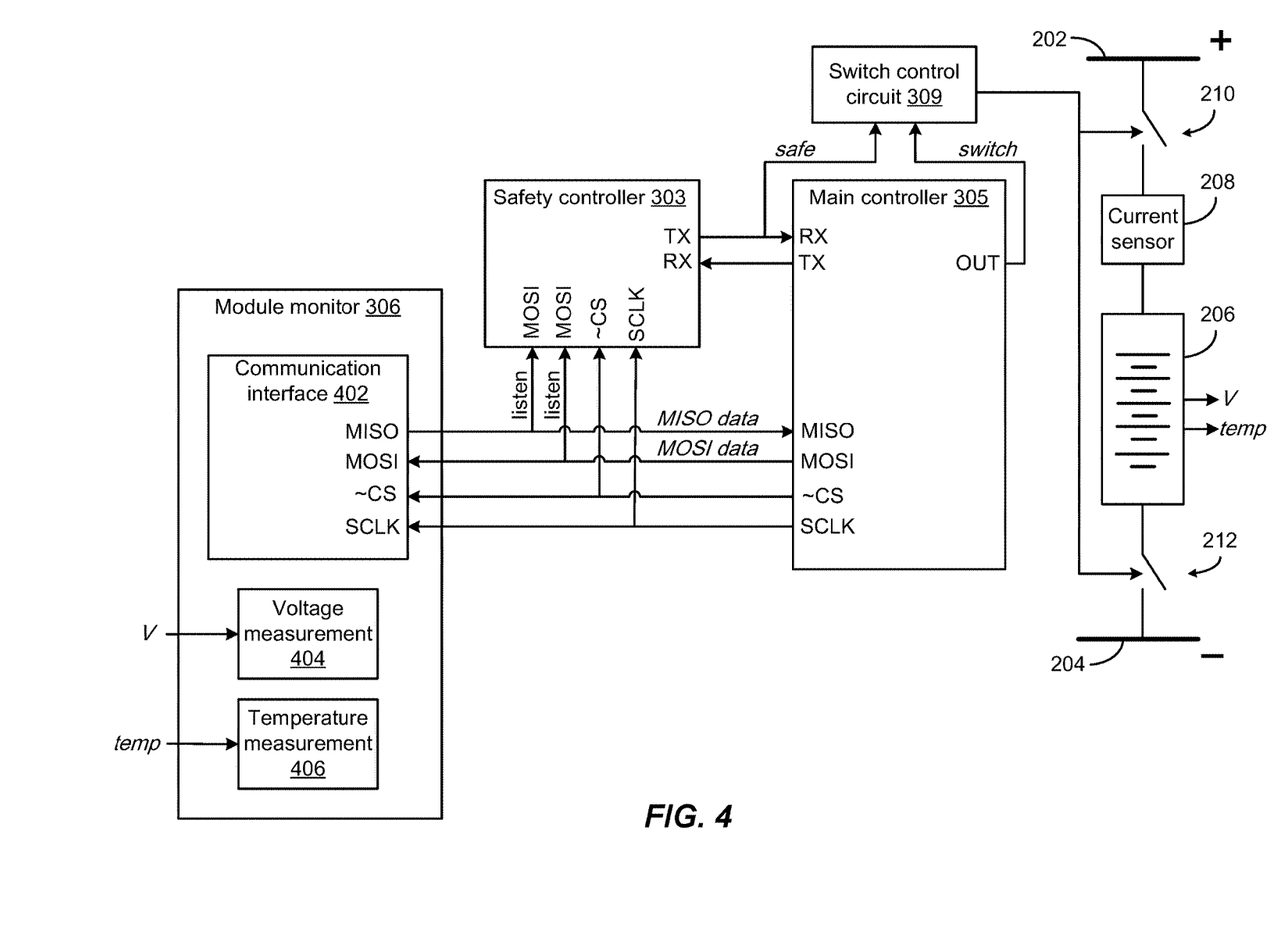
FIG. 4 is a block diagram of an example battery management communication verification system according to one embodiment.

FIG. 4 is a block diagram of an example battery management communication verification system according to one embodiment. The system illustrated in FIG. 4 includes the main controller 305 in serial or point-to-point communication with the module monitor 306, the safety controller 303 receiving and verifying data communicated between the main controller 305 and the module monitor 306, and the switch control circuit 309 configured to control the switches 210, 212. FIG. 4 also illustrates one exemplary battery string 206, which is associated with the module monitor 306, the main controller 305, the safety controller 303, and the switch control circuit 309. It is to be noted that the battery string 206 illustrated in FIG. 4 can be one of the plurality of battery strings 206 discussed in connection with FIG. 2 above and that the battery string 206 in FIG. 4 can also include a plurality of modules 308, each in communication with respective plurality of module monitors 306, as discussed in connection with FIG. 3 above. As such, the main controller 305 can be in serial or point-to-point communication with a plurality of module monitors 306 as discussed above in connection with FIG. 3 in accordance with the same advantages and principles illustrated and described in connection with FIG. 4.

The main controller 305 can be in serial or point-to-point communication with one or more of subsidiary units, such as the module monitor 306. In the example illustrated in FIG. 4, the main controller 305 is in communication with the module monitor 306 through an SPI interface. In some embodiments, a communication bus between the main controller 305 and the module monitor 306 can be implemented with an isoSPI interface and may include additional interface devices not illustrated in FIG. 4. The main controller 305 can receive subsidiary-to-main or master-in-slave-out (MISO) data from the module monitor 306, and the main controller 305 can send main-to-subsidiary or master-out-slave-in (MOSI) data to the module monitor 306. The data communication through the SPI interface is clocked to the clock signal (SCLK) from the main controller 305. It is to be noted that although only one module monitor 306 is illustrated in FIG. 4, the same principles and advantages are applicable to a communication system using multiple module monitors 306 as illustrated in FIG. 3 above. As such, the main controller 305 can control which subsidiary units to communicate with using the chip select (~CS) signal. In some embodiments, the subsidiary units such as the module monitor(s) 306 can be allocated in various parts or subsystems to gather various data. Also in some embodiments, the main controller 305 can be responsible for a collection of parts or subsystems communicating with the subsidiary units to inquire status, request more data, or provide commands. As such, the MISO data can include data regarding status, telemetry, performance, or operations of the parts or subsystems assigned to respective module monitors 306. And, MOSI data can include instructions regarding data gathering, operation, or performance.

For example, the communication system disclosed herein can be applied in a battery management system (e.g., 160 of FIG. 3) in an automobile, such as an electric vehicle. In such applications the module monitor 306 can include data gathering components, such as voltage measurement component 404 and temperature measurement component 406. In this example, the voltage measurement component 404 can receive voltage measurements, V, from the battery module 308 (FIG. 3) to which the module monitor 306 is coupled within the battery string 206. Similarly, the temperature measurement component 406 can receive temperature measurements, temp, from the battery module 308 (FIG. 3) to which the module monitor 306 is coupled within the battery string 206. It is to be noted that additional components such as an ADC can be included in the module monitor 306 for processing received data. In this example, the module monitor 306 includes a communication interface 402, which receives voltage and temperature data from the voltage measurement component 404 and the temperature measurement component 406. The communication interface 402 then communicates the voltage and temperature data of the corresponding battery module 308 to the main controller 305 through the SPI interface. In this example, the MISO data from the module monitor 306 to the main controller 305 includes voltage and temperature data of the battery module 308 (FIG. 3).

Also in this example, the main controller 305 can be configured to receive various data and measurements of or within the battery string 206, such as voltage and temperature data of individual battery modules 308 (FIG. 3) and voltage and current data of the battery string 206. Also, the main controller 305 can be configured to send requests to the module monitor 306 when data regarding the corresponding battery module 308 is to be collected. In some instances, the communication between the main controller 305 and the module monitor 306 can be based on inquiries from the main controller 305 to the module monitor 306 that the module monitor 306 responds to with the requested data. In other instances, the communication between the main controller 305 and the module monitor 306 can be based on regular default reports from the module monitor 306 to the main controller 305. In yet another instances, the communication between the main controller 305 and the module monitor 306 can be a mixture of varying degrees of combination of the two abovementioned cases.

The safety controller 303 can be configured to monitor and verify the communication between the main controller 305 and subsidiary units, such as the module monitor 306. In some embodiments, the safety controller 303 can be coupled to the communication bus between the main controller 305 and the subsidiary units as a passive listen-only component. In the illustrated example, the safety controller 303 can receive the MISO data communicated from the module monitor 306 to the main controller 305 and receive the MOSI data communicated from the main controller 305 to the module monitor 306. The safety controller 303 can also receive the additional serial communication control signals such as ~CS and SCLK. In some embodiments, the safety controller 303 can be implemented with a microprocessor capable of at least listening in the serial or point-to-point communication between the main controller 305 and the subsidiary units, such as the module monitor 306. In embodiments using SPI, the safety controller 303 can be a microcontroller having at least two ports of SPI so that the safety controller 303 can receive the MISO data from the subsidiary unit at its MOSI pin of one of its SPI ports and receive the MOSI data from the main controller 305 at its MOSI pin of another one of its SPI ports.

The safety controller 303 can also be configured to store or be capable of accessing certain information regarding communication data monitoring and verification. For example, in the battery management system example discussed above, the safety controller 303 may have predetermined acceptable ranges of voltage or temperature values stored or accessible as needed. For instance, the safety controller 303 may include internal memory for storing certain voltage or temperature parameters, or in other instances, the safety controller 303 can receive voltage or temperature parameters from an external memory (not shown) or from the main controller 305 if, for example, the parameters are updated. Also in this example, the safety controller 303 may be provided with expected types of inquiries, sequences of commands, or other communication routines that should be communicated from the main controller 305 to the module monitor 306. In embodiments using SPI, the safety controller 303 may be configured to store or access various communication verification metrics in the forms of SPI data protocol.

The safety controller 303 may also be implemented with capabilities to communicate a safety signal or verification indicator to the main controller 305 and/or other components to allow further action to be taken based on the safety signal or verification indicator. In the illustrated example in FIG. 4, the safety controller 303 is in bidirectional communication with the main controller 305 through a transmit (TX) and receive (RX) channel. In some embodiments the TX and RX can be implemented with interfaces such as UART. In other embodiments, the TX/RX communication between the safety controller 303 and the main controller 305 can be implemented with another SPI separate from the SPI bus that the safety controller 303 is monitoring and that is between the main controller 305 and subsidiary units, such as the module monitor 306. In other embodiments the safety controller 303 and the main controller 305 may be in communication using input output (I/O) pins such as general purpose input output (GPIO) pins, in which case the communication may or may not be bidirectional. For the safety controller 303 implemented in a battery management system as in the abovementioned examples, the safety controller 303 can be in communication with the main controller 305 to indicate that the data between the main controller 305 and the module monitor 306 are valid and as expected. In this example, the safety controller 303 can also be in communication with the switch control circuit 309 to allow the switch control circuit 309 to control the switches 210, 212, for example.

When the principles disclosed herein are implemented in a battery management system of an electric vehicle, the safety controller 303 can provide an added layer of data verification to monitor the voltage and temperature of the battery modules 308 (FIG. 3). For instance, in the example illustrated in FIG. 4, the MISO data may include serial data indicating that the battery module (e.g., 308 in FIG. 3) coupled to the module monitor 306 is measured to be at a particular temperature and has a particular measured voltage across the battery module. In this example, the safety controller 303 can have stored therein appropriate temperature and voltage ranges for a battery module. If the temperature is not within the valid range in this example, the safety controller 303 may output a safety signal that could trigger disconnecting the battery string 206 that includes the overheated battery module. In other instances, the temperature of the battery module may be approaching the limits of the acceptable range. In some embodiments, the communication between the main controller 305 and the module monitor 306 can include expected inquiry and response routine of the main controller 305 asking for additional temperature data in such instances. The safety controller 303 monitoring the high temperature data communicated from the module monitor 306 to the main controller 305 can observe whether the main controller 305 sends the expected additional inquiry to the module monitor 306. In this example, the safety controller 303 will be comparing expected data sequence of the main-to-subsidiary data and determine whether an error has occurred. If the main controller 305 fails to recognize certain alarming situations, such as rising temperature in this example, and fails to communicate expected commands, the safety controller 303 may indicate an error to trigger disconnecting the battery string 206 to which the main controller 305 is coupled.

It can be advantageous to implement a safety controller collectively verifying a serial or point-to-point data communication as disclosed herein. Redundant verification often involves fully duplicative redundancy, and in battery management systems, for example, individual constituent components (e.g., multiple module monitors 306 and the main controller 305) of the serial or point-to-point communication system may include respective redundant verification components or circuits. Serial communication safety verification system disclosed herein allows collective verification of subcomponents of the communication system and can reduce cost and complexity while allowing robust and redundant safety control. As implemented in a battery management system, the disclosed herein allows one safety controller 303 to monitor and verify safety of the multiple battery modules 308 within the battery string 206.

In the illustrated example, the communication system disclosed herein is implemented in a battery management system (e.g., 160 of FIG. 3) of an electric vehicle. In this example, the safety indicator or command from the safety controller 303 can be applied to controlling the switches 210, 212 to connect the battery string 206 to and from the power buses 202, 204. As such, the switch control circuit 309 can be configured to receive a verification indicator from the safety controller 303 and a switch command from the main controller 305, and based on the signals from the safety controller 303 and the main controller 305, the switch control circuit 309 can send signals to control the switches 210, 212. It is to be noted that using the safety command signal from the safety controller 303 to control the battery string switches 210, 212 is only one example application of the disclosed herein. In some embodiments, the switch control circuit 309 can be implemented with a logic gates or circuits, such as an AND gate, which allows the battery string 206 to connect to the power buses 202, 204 only when the both the safety controller 303 and the main controller 305 indicate the battery string 206 should or could be connected. Based on the selection of the signal polarity of the safe and switch signals, the switch control circuit 309 can be implemented with other logic gates or circuits. The disclosed herein can be applied in a different system other than the battery management system illustrated here where the multiple constituent components of the system are in serial or point-to-point communication with one another and a redundant yet collective verification of the serial or point-to-point communication can be used to control safety of the system.

Figure 5:
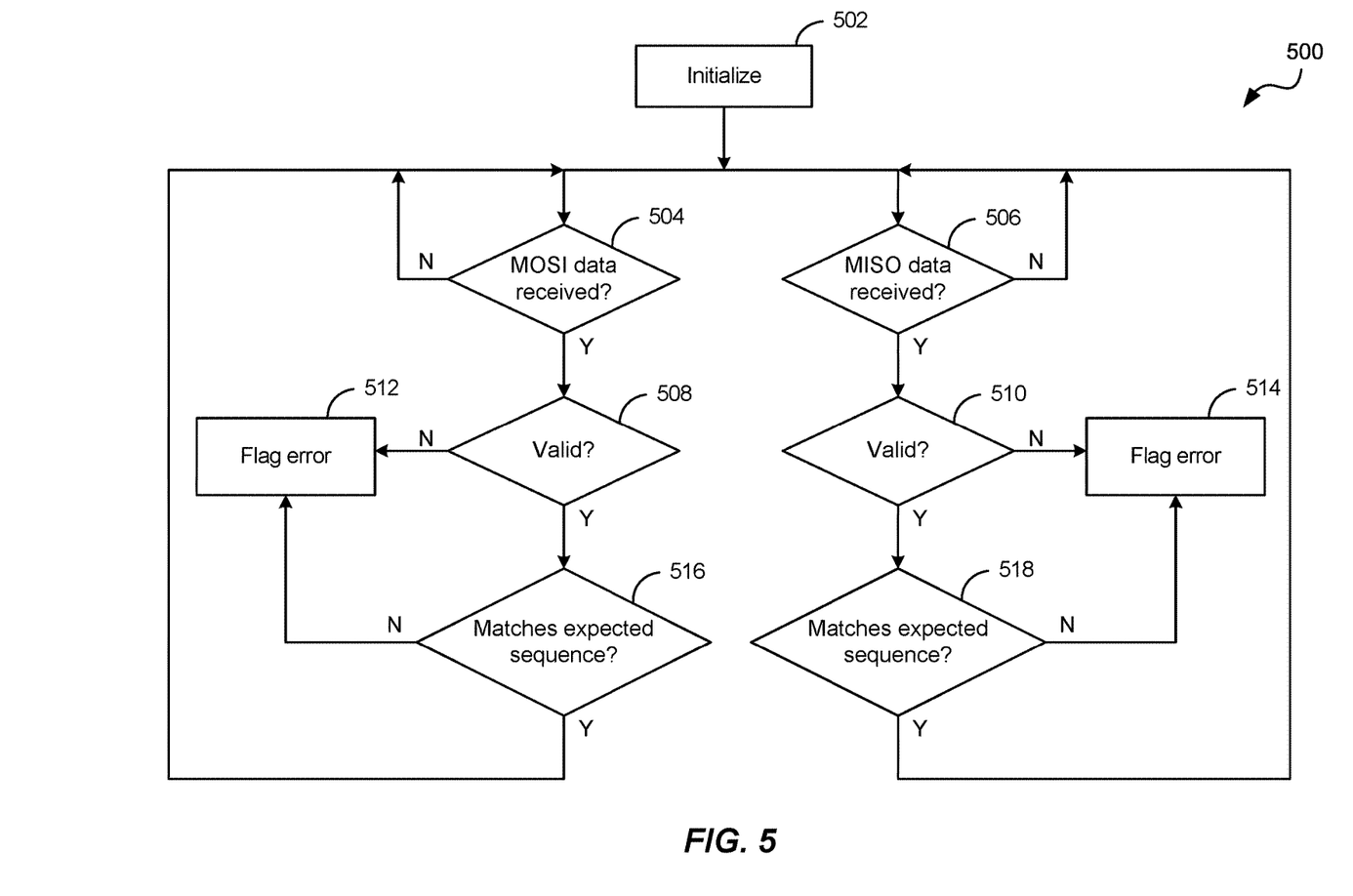
FIG. 5 is a flowchart of a communication verification process according to one embodiment.

FIG. 5 is a flowchart of a communication verification process according to one embodiment. The illustrated process 500 can be performed in part by and/or in conjunction with one or more components in the string control unit 304 (FIG. 3), such as the safety controller 303 (FIG. 3) or any other components in communication with the safety controller 303. It is to be noted that all or parts of steps 502, 504, 506, 508, 510, 512, 514, 516, and 518 may be concurrently, continuously, periodically, intermittently, repeatedly, or iteratively performed, and the illustrated process 500 in FIG. 5 is only one example embodiment of inventive features disclosed herein.

In step 502, the safety control process can be initialized, and the safety controller 303, for example, can be ready to receive the MOSI data communicated from the main controller 305 to the module monitor 306 and/or the MISO data communicated from the module monitor 306 to the main controller 305.

In step 504, whether the MOSI data is received by the safety controller (e.g., 303) is determined. If the MOSI data is received, the process 500 can proceed to step 508. If the MOSI data is not received, the process 500 can remain in standby.

In step 508, the validity of the MOSI data received is determined. In the battery management system example discussed above, the MOSI data may include commands or inquiries from the main controller 305 to the module monitor 306. If, for example, invalid or unintelligible serial data is communicated from the main controller 305 to the module monitor 306, the safety controller 303 may determine that an error may be occurring in or around the main controller 305. If the MOSI data from the main controller 305 to the module monitor 306 is valid, the process 500 proceeds to step 508. If the MOSI data from the main controller 305 to the module monitor is not valid, the process 500 proceeds to step 512.

In step 512, an error is flagged. In some examples, the safety controller 303 can send a signal indicating a MOSI data communication error has occurred to the main controller 305. Also, the safety controller 303 can send signals to other components such as the switch control circuit 309 to allow further safety action to take place, such as disconnecting the battery string 206 from the power buses 202, 204, for example.

In step 516, whether the MOSI data received matches expected data is determined. In the battery management system example discussed above, the MOSI data may include commands or inquiries from the main controller 305 to the module monitor 306, and such commands or inquiries may take a certain expected form and/or sequence. In some embodiments, the main controller 305 may be expected to ask for routine temperature and voltage data of the battery modules 308 in regular situations while it may be expected to ask specific targeted or more frequent temperature or voltage data in a more urgent situation (e.g., rising temperature still within an acceptable range). The safety controller 303 implemented as disclosed herein can be provided with what is expected of the main controller 309 to communicate to the module monitor 306, and the safety controller 303 may compare whether the MOSI data communicated from the main controller 305 to the module monitor 306 matches the expected sequence. If the MOSI data matches the expected sequence, the process 500 goes back to the initial standby mode ready to receive the MOSI and MISO data. If the MOSI data does not match the expected sequence, the process 500 goes to step 512 to flag an error.

In step 506, whether the MISO data is received by the safety controller (e.g., 303) is determined. If the MISO data is received, the process 500 can proceed to step 510. If the MISO data is not received, the process 500 can remain in standby.

In step 510, the validity of the MISO data received is determined. In the battery management system example discussed above, the MISO data may include temperature and voltage data regarding the respective battery modules 308 (FIG. 3). The validity of the MISO data can be determined in various ways. For example, the content of the MISO data, such as the module voltage and temperature level, can be outside of the acceptable range, which can render the MISO data invalid. In another example the form of the MISO data can be invalid or unintelligible. Depending on various implementations of the disclosed herein the data validity regarding the form and substance can be determined based on, for example, stored and/or accessible information by the safety controller 303. If the MISO data from the module monitor 306 to the main controller 305 are valid, the process 500 proceeds to step 518. If the MISO data from the module monitor 306 to the main controller 305 are not valid, the process 500 proceeds to step 514.

In step 514, an error is flagged. In some examples, the safety controller 303 can send a signal indicating a MISO data communication error has occurred to the main controller 305. Also, the safety controller 303 can send signals to other components such as the switch control circuit 309 to allow further safety action to take place, such as disconnecting the battery string 206 from the power buses 202, 204, for example.

In step 518, whether the MISO data received matches expected data is determined. In the battery management system example discussed above, the module monitor 306 and the main controller 305 can be in serial or point-to-point communication with each other based on certain routines and protocols. In some instances, the main controller 305 can request the module monitor 306 to send certain data of the battery module 308 to which it is coupled, and the module monitor 306 is expected to respond accordingly. If, for example, the module monitor 306 responds to temperature data inquiry from the main controller 305 with valid yet unrelated data, the safety controller 303 may compare the actual MISO data and the expected MISO data to determine whether the actual data matches the expected sequence. If the MISO data matches the expected sequence, the process 500 goes back to the initial standby mode ready to receive the MOSI and MISO data. If the MISO data does not match the expected sequence, the process 500 proceeds to step 514.

In some embodiments, the main-to-subsidiary data verification (i.e., the series of steps 504, 508, 512, 516) and the subsidiary-to-main data verification (i.e., the series of steps 506, 510, 514, 518) can be performed in parallel or in an interleaved manner. Also it is to be noted that the steps 508, 516, 510, and 518 can be performed in different orders or can be performed in one step depending on specific implementations or applications of the disclosed herein.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. An electric vehicle comprising:
   a motor coupled to one or more wheels of the electric vehicle;
   an inverter coupled to the motor;
   at least a first power bus coupled to the inverter;
   at least a first battery string comprising a plurality of battery modules, wherein the first battery string has an output that is coupled to the first power bus through a switch;
   at least a first battery string controller coupled to the first battery string;
   a plurality of battery module monitors coupled to respective ones of the plurality of battery modules, wherein the first battery string controller and at least a first battery module monitor communicate through a data bus; and
   at least a first safety controller associated with the battery string controller, wherein the first safety controller is connected to the data bus separately from the first battery string controller and the at least first battery module monitor, and wherein the first safety controller is configured to evaluate communications between the first battery string controller and the first battery module monitor.

2. The electric vehicle of claim 1, wherein the first safety controller is configured to receive data communicated between the battery string controller and at least a first battery module monitor using a serial peripheral interface (SPI) port.

3. The electric vehicle of claim 1, wherein the first safety controller is configured to output a safety signal through a connection other than the data bus.

4. The electric vehicle of claim 3, wherein the first battery string controller is configured to send a control signal to the first battery module monitor based in part on the safety signal.

5. The electric vehicle of claim 1, wherein at least a first battery module monitor is configured to send status data of at least a first battery module to the first battery string controller, and wherein the first safety controller is configured to receive the status data.

6. The electric vehicle of claim 5, wherein the first safety controller is configured to determine whether the status data matches an expected sequence or is within an expected range.

7. The electric vehicle of claim 5, wherein the status data of the first battery module comprise voltage data or temperature data of the first battery module.

8. The electric vehicle of claim 1, wherein the first safety controller is configured to evaluate communications between the first battery string controller and all of the plurality of battery modules.

9. The electric vehicle of claim 1, wherein the data bus is a serial peripheral interface (SPI), and wherein the first battery string controller and at least a first battery module monitor are in communication using a SPI protocol.

10. The electric vehicle of claim 2, wherein the first safety controller is further configured to receive data or commands communicated from the battery string controller to the at least first battery module monitor through a first master-out-slave-in (MOSI) pin of the first safety controller, and receive data or commands communicated from the at least first battery module monitor to the battery string controller through a second MOSI pin of the safety controller.

\* \* \* \* \*